United States Patent
Lyles et al.

(12)

(10) Patent No.: US 9,912,232 B2
(45) Date of Patent: Mar. 6, 2018

(54) PEAK CURRENT LIMITING IN INDUCTOR-BASED POWER CONVERTER

(71) Applicant: Cirrus Logic International Semiconductor Ltd., Edinburgh (GB)

(72) Inventors: Umar J. Lyles, Austin, TX (US); Ullas Pazhayaveetil, Cedar Park, TX (US); Jeffrey May, Dripping Springs, TX (US)

(73) Assignee: Cirrus Logic, Inc., Austin, TX (US)

( * ) Notice: Subject to any disclaimer, the term of this patent is extended or adjusted under 35 U.S.C. 154(b) by 47 days.

(21) Appl. No.: 15/144,725

(22) Filed: May 2, 2016

(65) Prior Publication Data
US 2017/0317580 A1  Nov. 2, 2017

(51) Int. Cl.
| H02M 3/158 | (2006.01) |
| H02M 3/04 | (2006.01) |
| H02M 1/08 | (2006.01) |
| H02M 1/00 | (2006.01) |

(52) U.S. Cl.
CPC .............. *H02M 3/04* (2013.01); *H02M 1/08* (2013.01); *H02M 3/158* (2013.01); *H02M 2001/0009* (2013.01)

(58) Field of Classification Search
CPC ............ H02M 1/08; H02M 1/32; H02M 1/36; H02M 3/04; H02M 3/155; H02M 3/156; H02M 3/158; H02M 2001/32
See application file for complete search history.

(56) References Cited

U.S. PATENT DOCUMENTS

| 5,717,322 A | 2/1998 | Hawkes et al. | |
| 6,677,738 B1 | 1/2004 | Hesse | |
| 7,545,129 B2 * | 6/2009 | Hane ..................... | H02M 3/158 323/282 |
| 2009/0322302 A1 | 12/2009 | Fukushi | |
| 2010/0253309 A1 | 10/2010 | Xi et al. | |
| 2012/0306466 A1 * | 12/2012 | Tabuchi ................ | H02M 3/156 323/282 |
| 2013/0249523 A1 * | 9/2013 | Knott .................... | H02M 3/155 323/311 |
| 2015/0326123 A1 * | 11/2015 | Fukushima .......... | H02M 3/158 323/271 |
| 2016/0065052 A1 | 3/2016 | Shinozaki et al. | |

* cited by examiner

*Primary Examiner* — Matthew Nguyen
(74) *Attorney, Agent, or Firm* — Norton Rose Fulbright US LLP

(57) ABSTRACT

A combination of inductor current thresholds and circuitry for controlling the inductor based on the thresholds may be implemented in a power converter. One or more of the inductor current thresholds may be variable. An inductor current threshold may be varied as part of a search algorithm for identifying a value resulting in full scale operation of the inductor without exceeding a safe limit. After each cycle of the power converter, circuitry may determine which current thresholds have been exceeded and which have not been exceeded and then generate indication signals for each of the thresholds. Control logic may receive the indication signals and adjust one of the inductor current thresholds used to determine timing for disconnecting and reconnecting current through the inductor of the power converter.

23 Claims, 10 Drawing Sheets

PEAK CURRENT LIMITING IN INDUCTOR-BASED POWER CONVERTER

FIELD OF THE DISCLOSURE

The instant disclosure relates to electronic circuitry. More specifically, portions of this disclosure relate to power converters with inductors.

BACKGROUND

Switching power converters provide regulated output voltages for numerous electronic products including lamps, such as light emitting diode and gas discharge type lamps, cellular telephones, computing devices, and personal digital assistants. Power converters, such as switching power converters, include an inductor that may be magnetized and used to drive current to generate a regulated output voltage for an end component, such as a speaker of a mobile device. However, the inductors have current limits and exceeding the current limit can be hazardous. Conventionally, current limits are enforced by detecting that the current exceeds a particular threshold and then disconnecting the inductor from a source. However, there is often a delay in disconnecting the inductor that causes the inductor current to still exceed the threshold.

FIG. 1 is one example of a conventional technique for limiting peak current according to the prior art. A line 102 indicates an inductor current. The current is ramping up and at time 112 crosses a threshold current value $I_{pk,th}$ shown as line 120. At time 114, the controller may detect that the threshold current value $I_{pk,th}$ is crossed after a delay $t_1$ from the actual crossing at time 112. Circuitry may then generate control signals that cause a switch to disconnect the inductor from the source to terminate the current ramping in the inductor. After a delay $t_2$, the inductor is disconnected at time 116. As a result of the delays $t_1$ and $t_2$, shown as a total $t_d$, the actual inductor current exceeded the peak current threshold $I_{pk,th}$ by an amount $\Delta I$. The $\Delta I$ amount may cause the inductor current to exceed safe operating ranges, and thus generate hazardous conditions.

Another conventional solution is to compensate for the delay $t_d$ by predicting when time 112 will occur. FIG. 2 is another example of a conventional technique for limiting peak current according to the prior art. The inductor can be disconnected at time 212, approximately delay time $t_d$ before the peak current threshold of line 120 is reached. However, this prediction technique can be inaccurate as there are other unknowns and parameters that can be difficult to predict. Further, to ensure the threshold current does not exceed the safe limits, the inductor must be operated conservatively by predicting peak current times much earlier than expected. However, this results in extremely conservative operation of the inductor and does not allow the inductor to operate at full scale. In fact, prediction errors may be as much as or more than 30%. A prediction with 30% error and resulting safety buffer results in significant under operation of the inductor.

Shortcomings mentioned here are only representative and are included simply to highlight that a need exists for improved electrical components, particularly for power converters employed in consumer-level devices, such as mobile phones. Embodiments described herein address certain shortcomings but not necessarily each and every one described here or known in the art.

SUMMARY

A combination of inductor current thresholds and circuitry for controlling the inductor based on the thresholds may be implemented in a power converter. One or more of the inductor current thresholds may be variable. An inductor current threshold may be varied as part of a search algorithm for identifying an appropriate inductor current threshold that causes disconnection of the inductor at an appropriate time to prevent the inductor from hazardous operation. A current sensor may be coupled to an inductor and may provide a measured inductor current value used to compare with one or more current thresholds. The comparisons may determine which current thresholds have been exceeded and which have not been exceeded and generate indication signals for each of the thresholds. Control logic may receive the indication signals and determine timing for disconnecting and reconnecting the inductor to a source. In some embodiments, the timing may be implemented as one or more control signals for operating one or more switches coupled to the inductor to disconnect the inductor from other circuitry. By using the threshold levels and comparisons based on those levels, the inductor current maximum may be operated closer to tolerance of the inductor. In some embodiments, precision control of the maximum inductor current may be achieved, in addition to preventing the inductor current from exceeding safe limits.

According to one embodiment, a method may include determining an inductor current through an inductor of a switch mode converter determining whether the inductor current exceeds a warning threshold; determining whether the inductor current exceeds an error threshold; adjusting the warning threshold based on the determination of whether the inductor current exceeds the warning threshold and the determination of whether the inductor current exceeds the error threshold; and/or generating a signal to de-activate a switch to prevent further increase of inductor current when the determined inductor current exceeds the warning threshold. Although example embodiments are shown for inductors of a switch mode converter, the methods and apparatuses described herein may be applied to inductors in any converter or circuit.

The warning threshold may be adjusted to keep an inductor current level in a safe operating region, such as below a peak current, and operating across a large range of the safe operating levels. In certain embodiments, the step of adjusting the warning threshold may include maintaining the warning threshold when both the inductor current is determined to not exceed the warning threshold and the inductor current is determined to not exceed the error threshold; increasing the warning threshold when both the inductor current is determined to exceed the warning threshold and the inductor current is determined to not exceed the error threshold; decreasing the warning threshold when both the inductor current is determined to exceed the warning threshold and the inductor current is determined to exceed the error threshold; and/or executing a search algorithm to determine a warning threshold that triggers the decreasing or increasing of the inductor current at an appropriate time to allow the inductor current to operate within an error threshold tolerance.

Although two thresholds are described above, additional threshold levels may be implemented. In some embodiments, three thresholds may be sufficient to obtain a deterministic solution to the switching time for the inductor-based power converter. In certain embodiments, the error threshold may include an error minimum threshold, and the method may further include determining whether the inductor current exceeds an error maximum threshold, wherein the step of adjusting the warning threshold may include adjusting the warning threshold based, at least in part, on the whether the inductor current exceeds the error maximum threshold.

The methods described above may be implemented in some embodiments in a switched power converter, such as for a boost converter for an audio amplifier of a mobile device. According one embodiment, an apparatus may include an inductor; a switch coupled to the inductor; a current sensor coupled to the inductor through the switch and configured to determine an inductor current through the inductor; a first comparator coupled to the current sensor and configured to receive an indication of the inductor current, to receive an indication of a warning threshold, and to generate a warning indication signal based on a comparison of the inductor current with the warning threshold; a second comparator coupled to the current sensor and configured to receive an indication of the inductor current, to receive an indication of an error threshold, and to generate an error indication signal based on a comparison of the inductor current with the error threshold; a driver coupled to the switch and configured to de-activate the switch based, at least in part, on the generated warning indication signal, wherein de-activating the switch prevents a further increase of the inductor current; and/or a controller coupled to the first comparator and the second comparator, wherein the controller is configured to adjust the warning threshold based, at least in part, on the error indication signal and the warning indication signal. In certain embodiments, the driver may be configured to de-activate the switch based on the generated warning indication to cause a decrease of the inductor current at an appropriate time to prevent the inductor current from exceeding the error threshold.

In some embodiments, the controller may be configured to perform steps of maintaining the warning threshold when both the inductor current is determined to not exceed the warning threshold and the inductor current is determined to not exceed the error threshold; increasing the warning threshold when both the inductor current is determined to exceed the warning threshold and the inductor current is determined to not exceed the error threshold; and/or decreasing the warning threshold when both the inductor current is determined to exceed the warning threshold and the inductor current is determined to exceed the error threshold.

Additional thresholds may be implemented in some embodiments through additional comparators in the apparatus. For example, in some embodiments, the apparatus may include a third comparator coupled to the current sensor and configured to receive an indication of the inductor current, to receive an indication of a second error threshold, and to generate a second error indication signal based on a comparison of the inductor current with the second error threshold, and wherein the controller is further coupled to the third comparator and configured to adjust the warning threshold based, at least in part, on the second error indication signal.

In yet another embodiment, an apparatus may include a controller configured to perform steps of receiving an indication of whether an inductor current exceeds a warning threshold; receiving an indication of whether the inductor current exceeds an error threshold; adjusting the warning threshold based on the determination of whether the inductor current exceeds the warning threshold and the determination of whether the inductor current exceeds the error threshold; and/or generating a signal to de-activate a switch to prevent further increase of inductor current when the determined inductor current exceeds the warning threshold.

The warning threshold may be adjusted by maintaining the warning threshold when both the inductor current is determined to not exceed the warning threshold and the inductor current is determined to not exceed the error threshold; increasing the warning threshold when both the inductor current is determined to exceed the warning threshold and the inductor current is determined to not exceed the error threshold; decreasing the warning threshold when both the inductor current is determined to exceed the warning threshold and the inductor current is determined to exceed the error threshold; and/or executing a search algorithm to determine a warning threshold that triggers the decrease or increase of the inductor current at an appropriate time to allow inductor current to operate within an error threshold tolerance.

In certain embodiments, the error threshold may include an error minimum threshold, and the controller may be further configured to perform the step of receiving an indication of whether the inductor current exceeds an error maximum threshold, wherein the step of adjusting the warning threshold may include adjusting the warning threshold based, at least in part, on the indication of whether the inductor current exceeds the error maximum threshold.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Current through an inductor may be maintained at safe levels by monitoring the current level through the inductor, comparing the current level to one or more thresholds, and operating circuitry around the inductor based on the comparison of the current level to the thresholds. Embodiments of the invention described herein refer to controlling current through an inductor of a switch mode converter. However, aspects of the invention may be applied to any circuitry with measured and controlled quantities, such as the inductor current through an inductor of a switched power converter or other currents or voltages in other circuitry.

Figure 1:
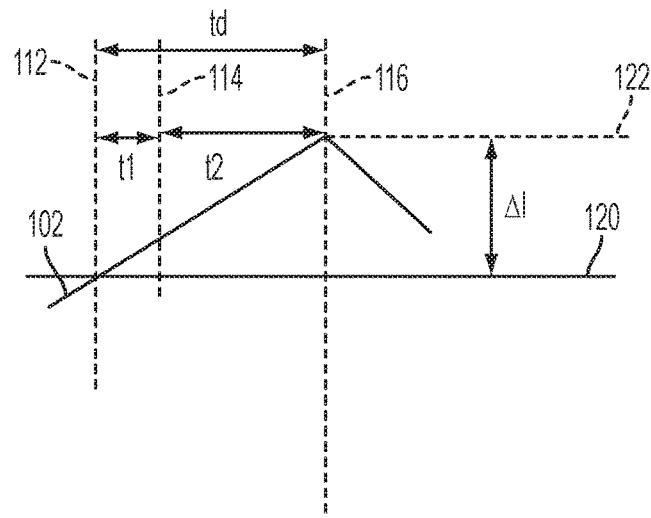
FIG. 1 is one example of a conventional technique for limiting peak current according to the prior art.
Figure 2:
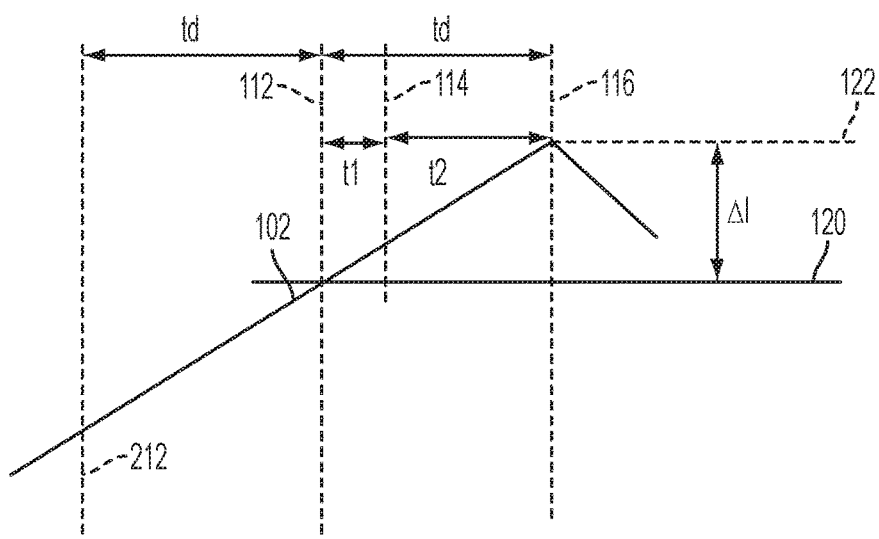
FIG. 2 is another example of a conventional technique for limiting peak current according to the prior art.
Figure 3:
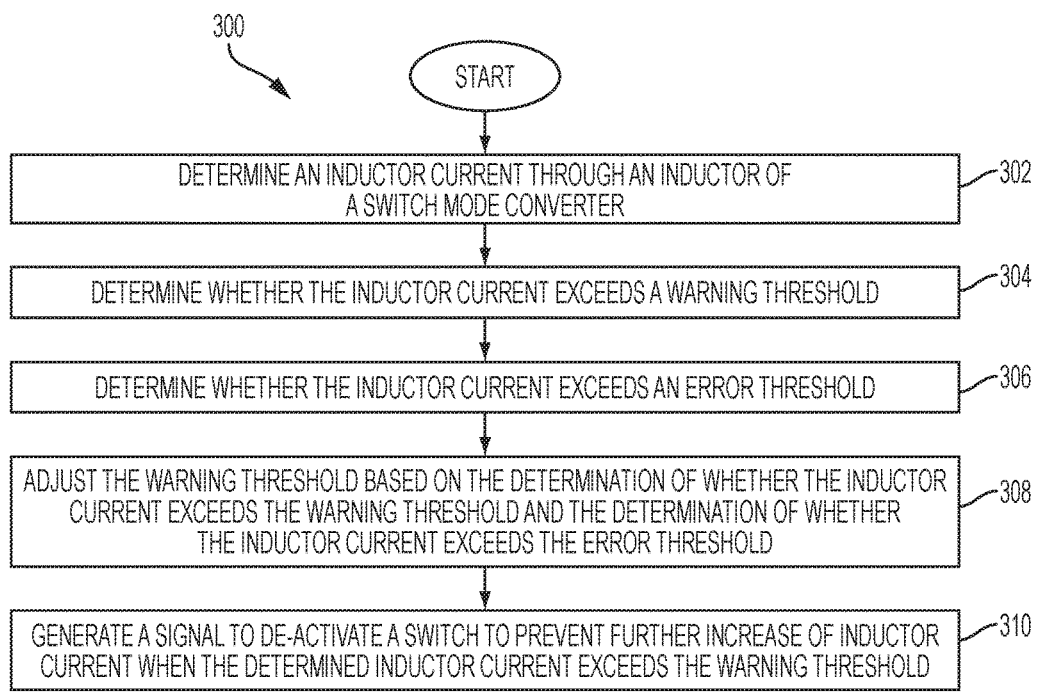
FIG. 3 is an example flow chart illustrating a method of controlling inductor current in a power converter according to one embodiment of the disclosure.

FIG. 3 is an example flow chart illustrating a method of controlling inductor current in a power converter according to one embodiment of the disclosure. A method 300 may begin at block 302 with determining an inductor current through an inductor of a switch mode converter. The inductor current may be determined by measuring the inductor current with circuitry coupled to the inductor or by estimating or predicting the inductor current. The determined inductor current may then be compared to one or more threshold values. For example, at block 304, the inductor current is compared to a warning threshold. The warning threshold may be a value set to provide information that the inductor current is reaching unsafe levels. In some embodiments, the warning threshold may be a variable quantity. As another example, at block 306, the inductor current is compared to an error threshold. The error threshold may be a value set to provide information that the inductor current is close to exceeding or has exceeded safe levels.

Circuitry around the inductor may also be controlled based on the comparisons at block 304 and block 306. In one embodiment, the inductor current may be determined to exceed a warning threshold at block 304, causing control logic to deactivate a switch to disconnect the inductor and to stop current flow through the inductor, such as at block 310. During the delay from detecting the warning threshold crossing and stopping current through the inductor, the inductor current may cross the error threshold. This crossing may be recorded temporarily, such that circuitry may determine, at block 306, whether the inductor current exceeded the error threshold.

In some embodiments, the warning threshold may be adjusted from one cycle to another cycle of the power converter to allow operation of the inductor at full scale current when desired and to do so without causing the peak current through the inductor to exceed safe levels. At block 308, the level of the warning threshold may be adjusted based on whether the inductor current exceeded the error threshold. For example, if the inductor current exceeded the warning threshold but did not exceed the error threshold, the warning threshold may be adjusted upward. Adjusting the warning threshold upward may allow the inductor to operate at higher currents during future cycles of the power converter. As another example, if the inductor current exceeded the warning threshold and exceeded the error threshold, the warning threshold may be adjusted downward. Adjusting the warning threshold downward may reduce peak current through the inductor and may maintain the peak current at safe levels.

Figure 4:
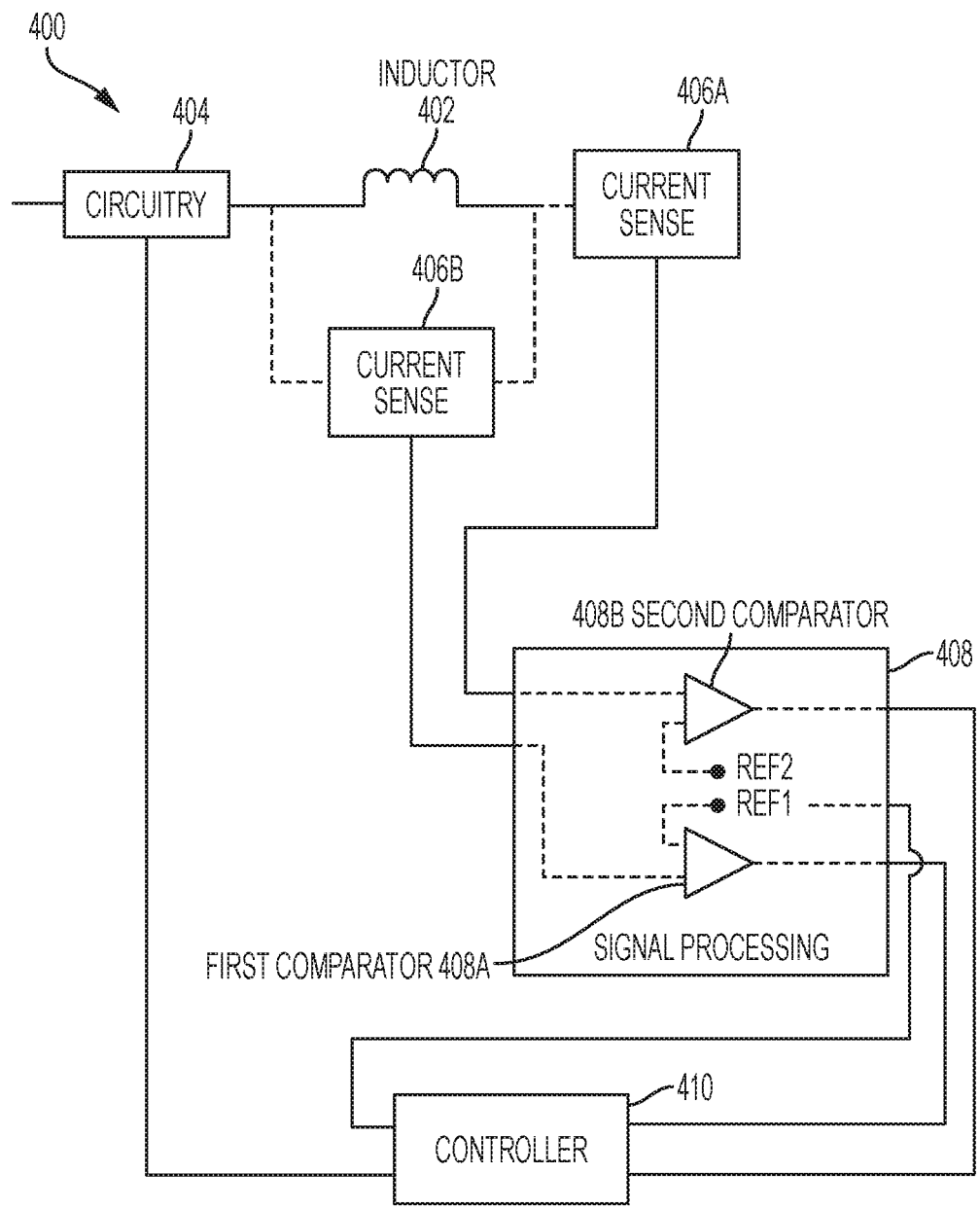
FIG. 4 is an example block diagram illustrating an apparatus for controlling inductor current according to one embodiment of the disclosure.

Example circuitry for operating an inductor similarly to that described above is shown in FIG. 4. FIG. 4 is an example block diagram illustrating an apparatus for controlling inductor current according to one embodiment of the disclosure. A circuit 400 may include an inductor 402. Circuitry 404, such as drivers or switches, may be coupled to the inductor 402. Additionally, current sensing circuitry 406A and/or 406B may be coupled to the inductor 402. In one embodiment, current sensing circuitry 406B may be coupled in parallel to measure current through the inductor 402. In some embodiments, current sensing circuitry 406A may be coupled in series with the inductor 402.

Signal processing circuitry 408 may be coupled to the current sensing circuitry 406A and/or 406B. The signal processing circuitry 408 may include circuitry, such as logic circuitry, for comparing the measured current values to one or more threshold values. The signal processing circuitry 408 may include a first comparator 408A and/or a second comparator 408B. The first comparator 408A may compare the measured current value with a first reference level, such as a warning threshold level. The second comparator 408B may compare the measured current value with a second reference level, such as an error threshold level. In some embodiments, the signal processing circuitry 408 may be an analog-to-digital converter (ADC), a digital signal processor (DSP), a central processing unit (CPU), or other digital circuitry for comparing two or more values.

A controller 410 may be coupled to the signal processing circuitry 408 and the circuitry 404. The controller 410 may receive information regarding the results of comparisons in the signal processing circuitry 408. For example, the controller 410 may receive two Boolean values indicating whether the current value exceeds the warning threshold or the error threshold. Although two signal lines are shown coupling the signal processing circuitry 408 with the controller 410, there may be more or less signal lines. For example, if additional threshold levels are implemented, the signal processing circuitry 408 may generate three or more Boolean outputs. As another example, a single signal line may couple the signal processing circuitry 408 to the controller 410 by multiplexing multiple Boolean results onto a single bus.

The controller 410 may operate circuitry 404 based on information received from the signal processing circuitry 408. For example, when the signal processing circuitry 408 indicates that the current value exceeded the warning threshold, the controller 410 may de-activate a switch in the circuitry 404 to discontinue current through the inductor 402. The controller 410 may also provide feedback to the signal processing circuitry 408 to adjust a warning threshold. For example, the controller 410 may provide a signal that causes the signal processing circuitry 408 to increase or decrease the first reference voltage, such as the warning threshold. In another example, the controller 410 may adjust an actual reference voltage level provided to the signal processing circuitry 408.

Although certain functionality is described with respect to certain circuitry or blocks in the illustration of FIG. 4, the functionality may be organized differently. For example, the signal processing circuitry 408 may be integrated with the controller 410 as a single integrated circuit (IC). In some embodiments, the entire circuit 400 of FIG. 4 may be implemented as a single controller integrated circuit (IC), such as an audio coder/decoder (CODEC) chip.

Figure 5:
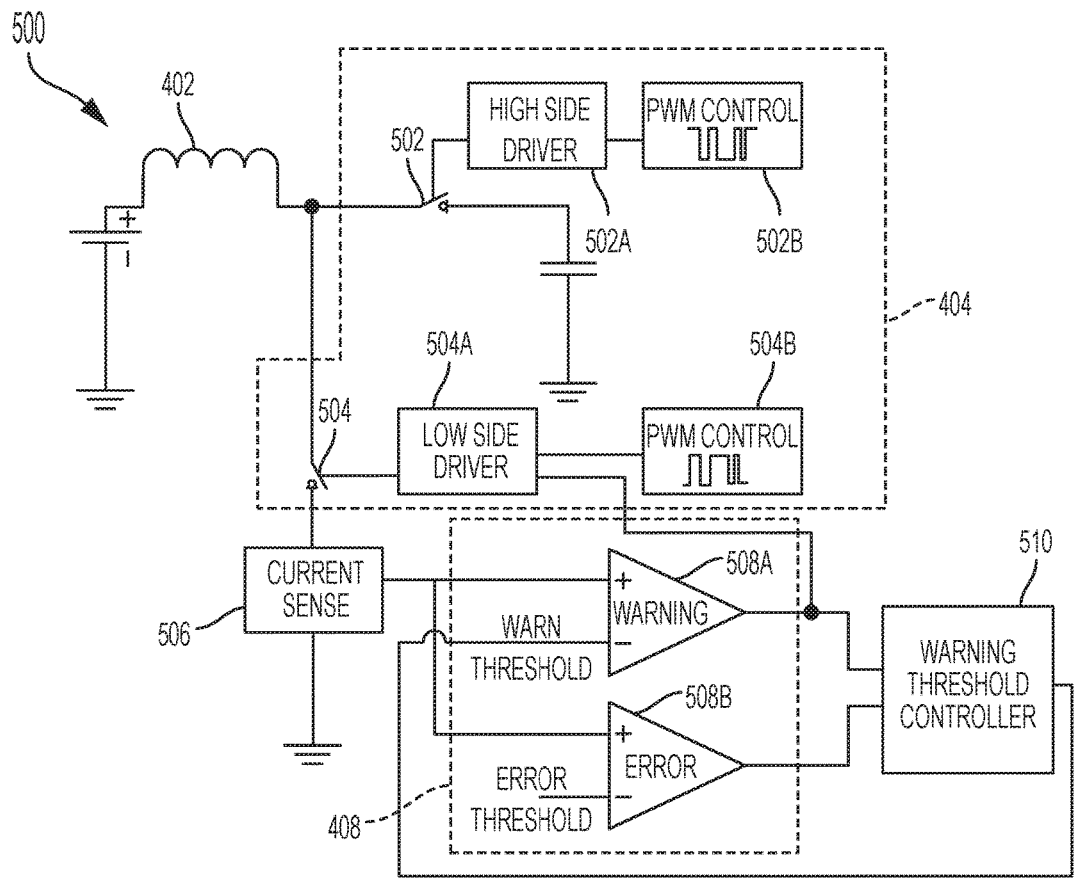
FIG. 5 is an example block diagram illustrating a switched power converter with inductor current control according to one embodiment of the disclosure.

The functionality described above may be integrated into a switch power converter having an inductor. FIG. 5 is an example block diagram illustrating a switched power converter with inductor current control according to one embodiment of the disclosure. A circuit 500 includes the inductor 402 and circuitry 404 coupled to the inductor 402. The circuitry 404 may include a high-side switch 502 and a low-side switch 504. The high-side switch 502 and low-side switch 504 may be coupled to high-side driver 502A and low-side driver 504A, respectively. The high-side driver 502A and low-side driver 504A may be coupled to pulse-width modulation control 502B and 504B, respectively. The switches 502 and 504 may be operated, in part, to control current levels through the inductor 402.

Current sense circuitry 506 may be coupled to the inductor 402, such as through low-side switch 504, and configured to measure a current level through the inductor 402. An output of the current sense circuitry 506 may provide information about the current level through the inductor 402. That information may be provided to signal processing circuitry 408, such as a first comparator 508A and a second comparator 508B. The comparators 508A and 508B may compare the current level to a warning threshold and an error threshold, respectively. A controller 510 may be coupled to an output of the comparators 508A and 508B and provide feedback to the first comparator 508A to adjust the warning threshold. An output of the first comparator 508A may also be provided to the low-side driver 504A. When the current level exceeds the warning threshold, the output of the first comparator 508A may cause the low-side driver 504A to de-activate switch 504 and thus begin to discontinue current through the inductor 402.

Figure 6:
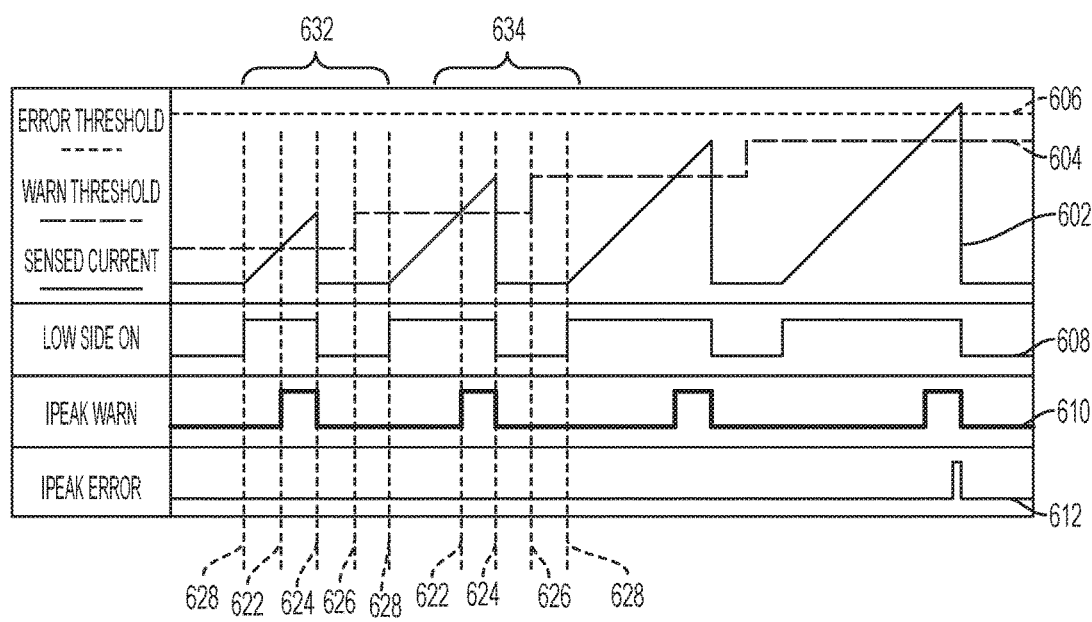
FIG. 6 is an example graph illustrating operation of a switched power converter with inductor current control according to one embodiment of the disclosure.

Example operation of the adjusting of the warning threshold according to some embodiments of the invention is described with reference to FIG. 6. FIG. 6 is an example graph illustrating operation of a switched power converter with inductor current control according to one embodiment of the disclosure. In FIG. 6, a line 602 illustrates a sensed current through an inductor, a line 604 illustrates a warning threshold, and a line 606 illustrates an error threshold. Further, a line 608 illustrates activating and de-activating of a switch coupled to the inductor, a line 610 illustrates an output of a comparator comparing the sensed current of line 602 with the warning threshold of line 604, and a line 612 illustrates an output of a comparator comparing the sensed current of line 602 with the error threshold of line 606. Beginning at time 628, the signal of line 608 goes high to activate a switch and begin current flow through the inductor. The sensed current of line 602 then begins to rise at time 628. At time 622, the sensed current of line 602 exceeds the warning threshold of line 604 causing the comparator output of line 610 to go high. Shortly after time 622, at time 624, the control signal of line 608 goes low to de-activate the switch and to discontinue current flow through the inductor causing the measured current of line 602 to drop to zero at time 624. At time 626, the controller determines that the warning threshold was reached but that the error threshold was not reached and increases the warning threshold. The cycle 632 then repeats as cycle 634 and additional cycles such that the warning threshold is increased until an error threshold is crossed. When the error threshold is crossed, the adjustment of the warning threshold may begin a time in which the warning threshold is oscillated up and down, as compared with the ramping of the warning threshold shown in FIG. 6. This oscillating operation will be described with reference to FIG. 8 below.

Figure 7:
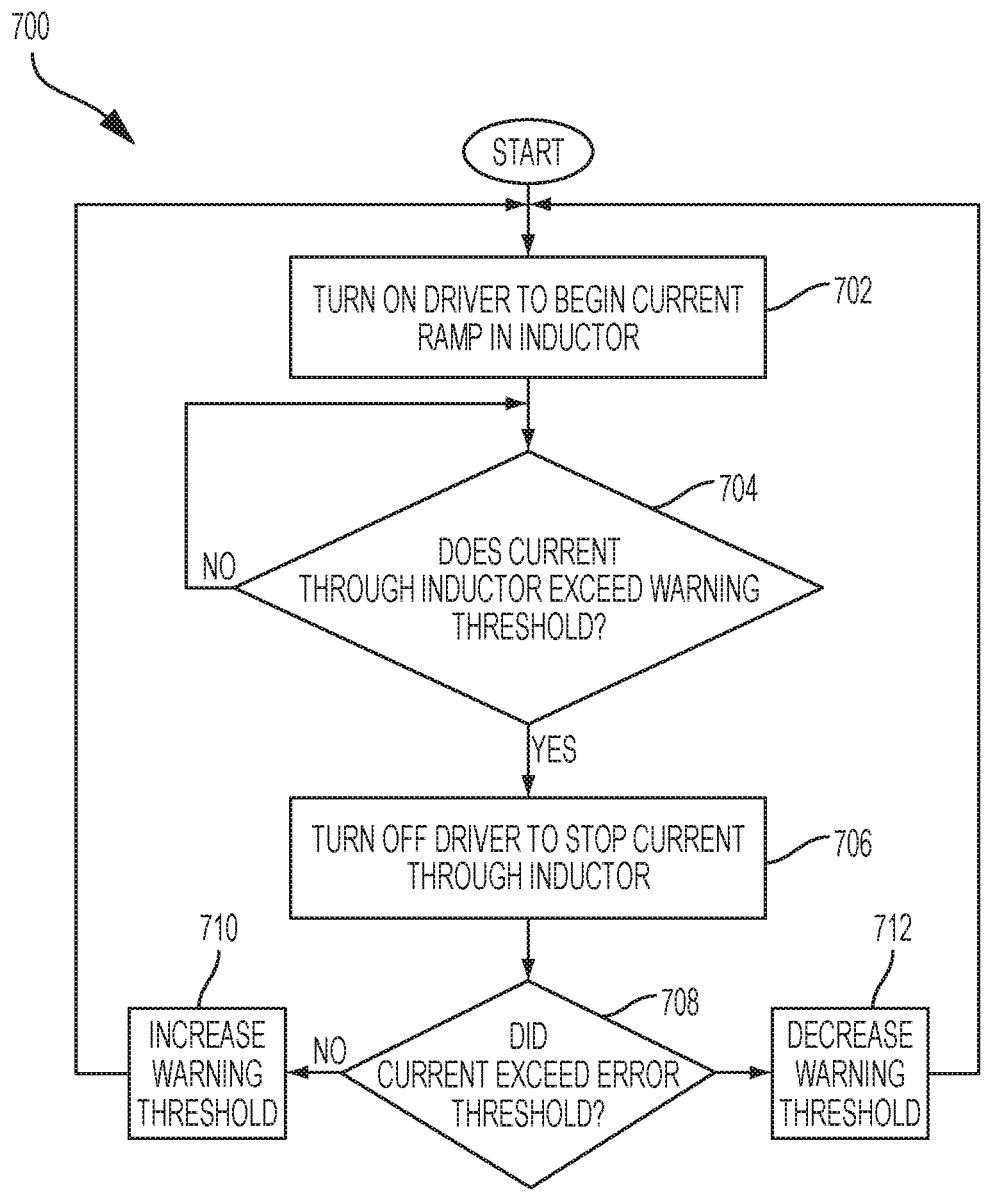
FIG. 7 is an example flow chart illustrating a method for operating a switched power converter with inductor current control according to one embodiment of the disclosure.

The operation of a controller in adjusting the warning threshold and activating and de-activating a switch to control current flow through the inductor is described with reference to FIG. 7. FIG. 7 is an example flow chart illustrating a method for operating a switched power converter with inductor current control according to one embodiment of the disclosure. A method 700 may begin at block 702 with turning on a driver to begin a current ramp in an inductor, such as shown at time 628 of FIG. 6. Although block 702 describes turning on a driver, block 702 may include any action that begins current ramping through the inductor. Then, at block 704, it may be determined, such as by a comparator or other signal processing circuitry, whether a current through the inductor has exceeded a warning threshold. If not, the test of block 704 may continue to be applied until the warning threshold is exceeded.

After the warning threshold is exceeded, the method 700 continues to take steps to prevent the inductor current from reaching unsafe levels. At block 706, the driver is turned off to stop current through the inductor, or another action to discontinue current ramping through the inductor may be taken. In some embodiments, the driver may be operated based on output of a comparator, either directly from the comparator or other circuitry output or indirectly from a controller output. Then, at block 708, it is determined whether the current level through the inductor exceeded the error threshold. If not, the warning threshold may be increased at block 710, and the method 700 repeated for another cycle of current through the inductor. If the warning threshold was exceeded at block 708, the warning threshold may be decreased at block 712 and the method 700 repeated for another cycle of current through the inductor.

The operation of FIG. 7 illustrates the execution of search algorithm for an appropriate warning threshold level by increasing or decreasing the warning threshold at blocks 710 and 712. The illustrated search algorithm is a linear search algorithm. However, a linear search algorithm is only one embodiment of the invention described herein. In other embodiments of the invention, the search may be performed by executing other algorithms, such as a binary search algorithm.

Operation of a circuit by ramping up the warning threshold through blocks 708 and 710 of FIG. 7 was shown in FIG. 6. After the warning threshold reaches a level allowing the inductor to operate at near full scale without exceeding the error threshold, the following power cycle may result in the inductor current crossing the error threshold. This reached level results in block 708 of FIG. 7 branching to block 712, where the warning threshold is decreased to prevent the inductor current from reaching the error threshold in the following power cycle. In a steady state condition, the warning threshold will continue to oscillate between two levels, in which one level causes the current level to exceed the error threshold and one level does not cause the current level to exceed the error threshold. The warning threshold may continue to oscillate between these two levels during operation of the circuit. This oscillation is shown with reference to FIG. 8.

Figure 8:
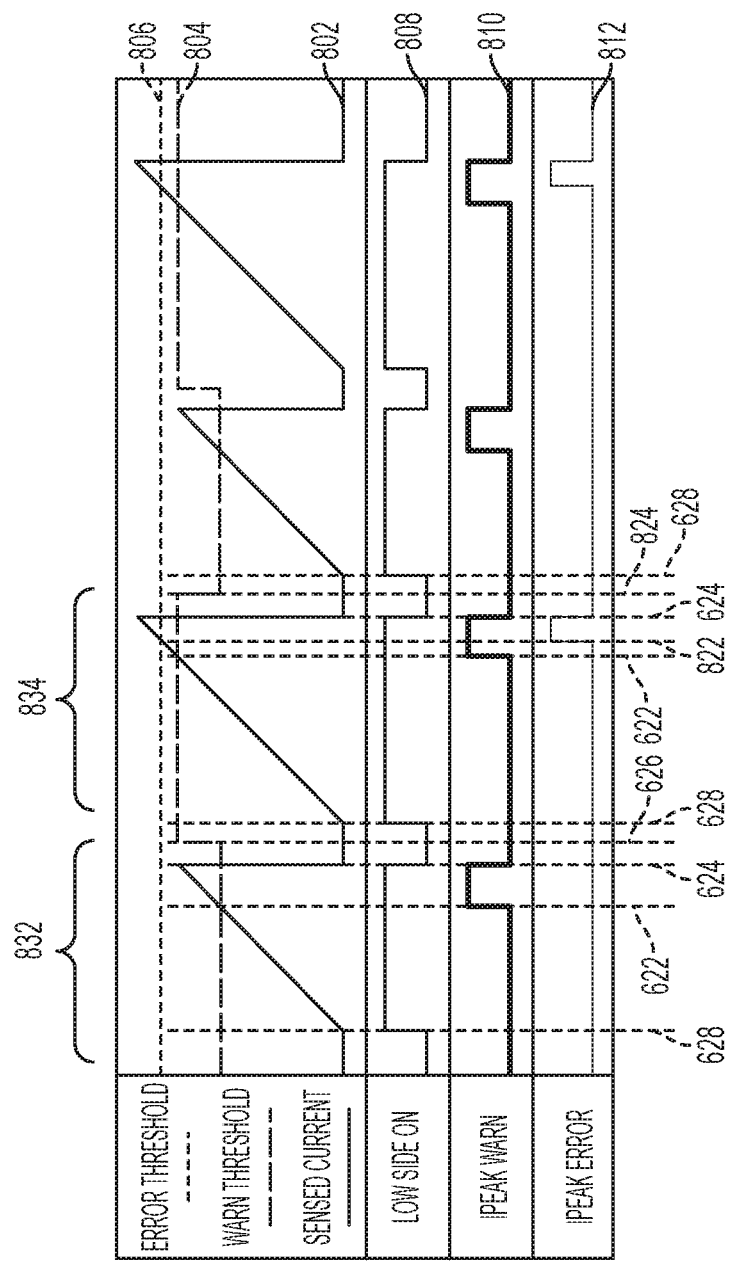
FIG. 8 is an example graph illustrating operation of a switched power converter after an approximate steady state is reached according to one embodiment of the disclosure.

FIG. 8 is an example graph illustrating operation of a switched power converter after an approximate steady state is reached according to one embodiment of the disclosure. In FIG. 8, a line 802 illustrates a sensed inductor current, a line 804 illustrates a warning threshold level, and a line 806 illustrates an error threshold level. A line 808 illustrates operation of a switch coupled to the inductor, a line 810 illustrates an output of a first comparator for detecting warning threshold crossing, and a line 812 illustrates an output of a second comparator for detecting error threshold crossing. The graph shows two time regions 832 and 834 illustrating the oscillating state of the warning threshold level. Time region 832 shows operation similar to that of FIG. 6: current through an inductor begins at time 628, a warning threshold is crossed at time 622, current through the inductor is turned off at time 624, and a warning threshold is increased at time 626. Time region 834 shows operation through blocks 708 and 712 of FIG. 7 to decrease the warning threshold level. At time 628, current is started through the inductor. Then, at time 622, the warning threshold is crossed. Next, at time 822, the error threshold is crossed. Then, at time 624, the current through the inductor is disconnected. Next, at time 824, the warning threshold level is decreased. A new power cycle then begins at time 628 with the decreased warning threshold level. As shown through the remainder of operation illustrated in FIG. 8, the warning threshold level may continue to increase and decrease with each power cycle.

Figure 9:
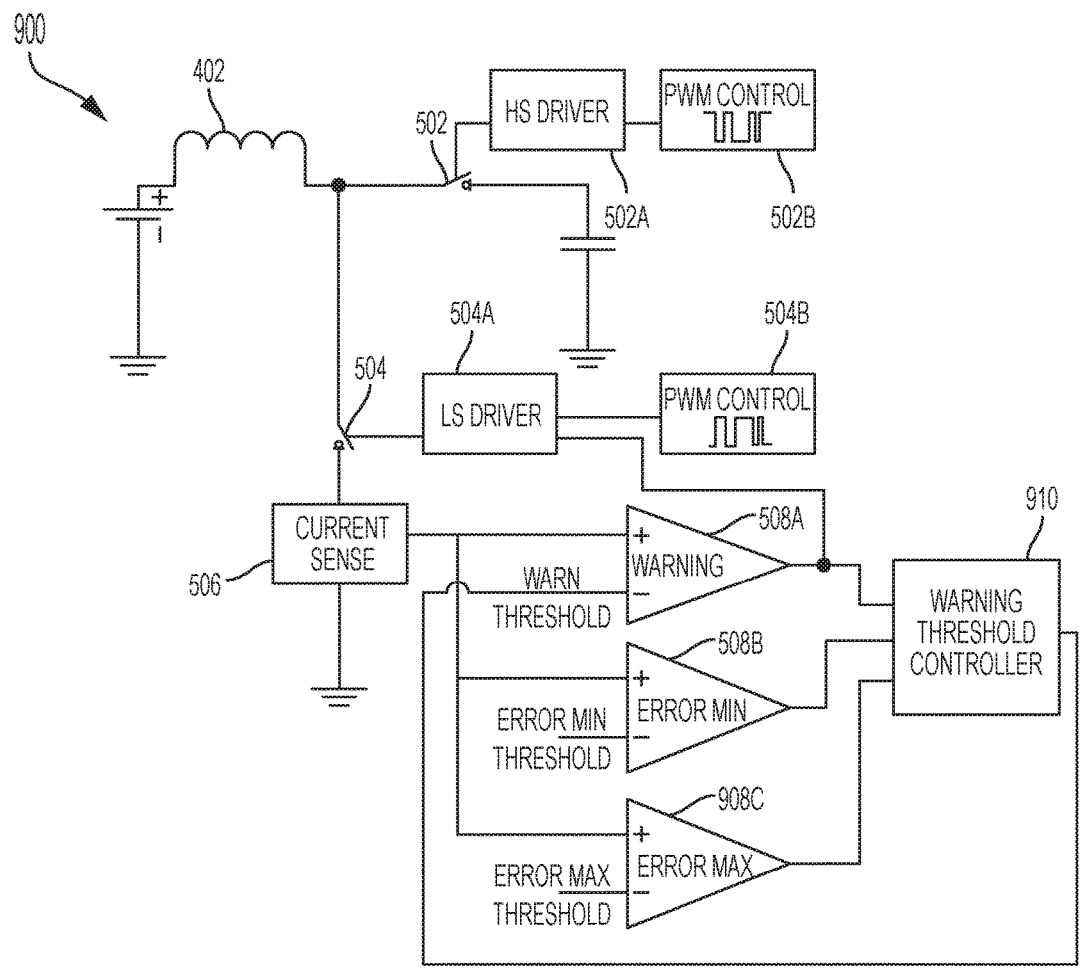
FIG. 9 is an example block diagram illustrating operation of a switched power converter with inductor current control based on three threshold levels according to one embodiment of the disclosure.

Embodiments described above included two threshold levels. However, additional threshold levels may be implemented in other embodiments of the invention. For example, three threshold levels may be implemented as a warning threshold level, a minimum error threshold level, and a maximum error threshold level. In some embodiments, three threshold levels may be used to obtain a deterministic solution to a desired warning threshold level. FIG. 9 is an example block diagram illustrating operation of a switched power converter with inductor current control based on three threshold levels according to one embodiment of the disclosure. A circuit 900 may include similar elements as the circuit 500 of FIG. 5, but also include a third comparator 908C configured to compare a sensed current with a maximum error threshold reference. A controller 910 may be coupled to the comparators 508A, 508B, and 908C and configured to adjust the warning threshold to operate the switch 504 and thus control current through the inductor 402. Although the embodiment of FIG. 9 illustrates a switched power converter, multiple threshold levels for inductor current may be configured in circuitry, such as other power converter circuitry or other circuitry including an inductor.

Figure 10:
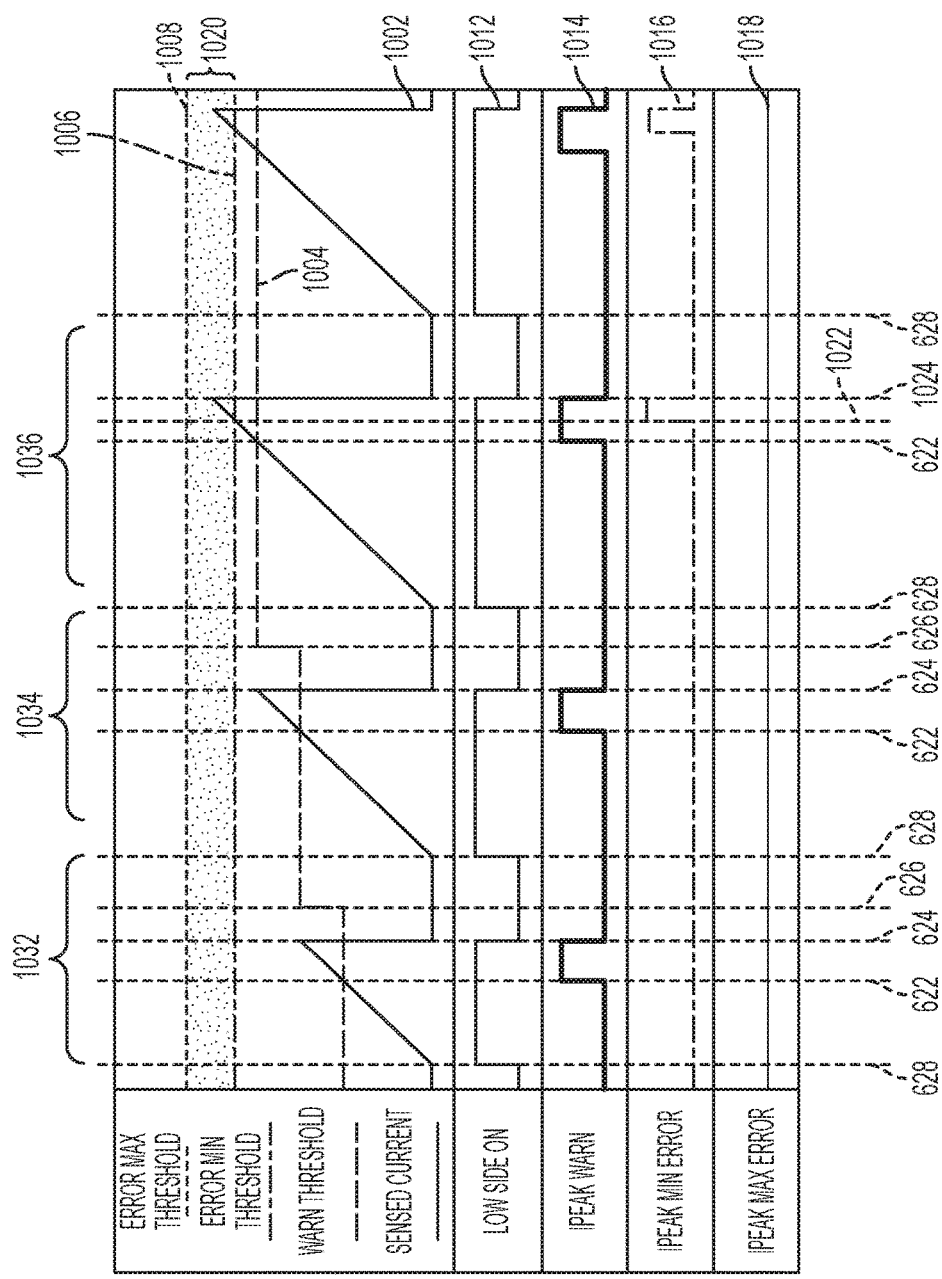
FIG. 10 is an example graph illustrating operation of a switched power converter with inductor current control based on three threshold levels according to one embodiment of the disclosure.

One example operation of the circuit 900 is shown in the signal graphs of FIG. 10. FIG. 10 is an example graph illustrating operation of a switched power converter with inductor current control based on three threshold levels according to one embodiment of the disclosure. In FIG. 10, a line 1002 illustrates a sensed inductor current, a line 1004 illustrates a warning threshold level, a line 1006 illustrates a minimum error threshold level, and a line 1008 illustrates a maximum error threshold. A line 1012 illustrates operation of a switch coupled to the inductor, a line 1014 illustrates an output of a first comparator for detecting warning threshold crossing, a line 1016 illustrates an output of a second comparator for detecting minimum error threshold crossing, and a line 1018 illustrates an output of a third comparator for detecting maximum error threshold crossing.

Operation through time periods 1032 and 1034 progresses similarly to that of time periods 632 and 634 of FIG. 6 during which the warning threshold level is increased after each power cycle. In time period 1036, the inductor current exceeds the minimum error threshold level at time 1022. Current through the inductor is then switched off at time 1024. Because the inductor current ended in a region 1020 between the minimum error threshold 1006 and the maximum error threshold 1008, the search for an appropriate warning threshold level may be terminated. The warning threshold level may then remain fixed for a certain period of time or until the inductor current is detected to exceed the maximum error threshold level 1008. In some embodiments with three threshold levels, the oscillatory behavior of the two-threshold embodiments described above may be avoided.

Figure 11:
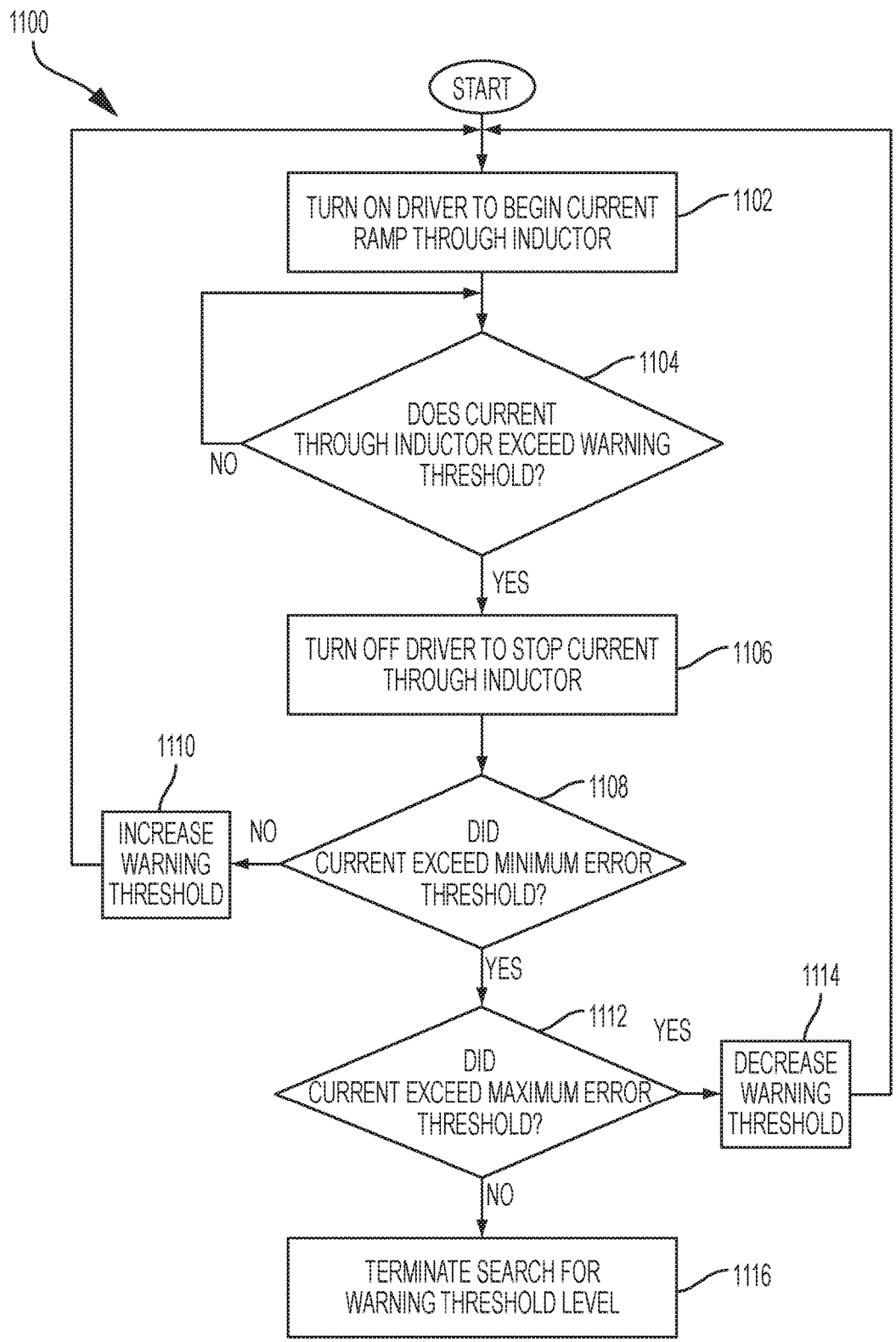
FIG. 11 is an example flow chart illustrating a method for operating a switched power converter with inductor current control based on three threshold levels according to one embodiment of the disclosure.

A flow chart describing operation of a power converter circuit with three thresholds is described with reference to FIG. 11. FIG. 11 is an example flow chart illustrating a method for operating a switched power converter with inductor current control based on three threshold levels according to one embodiment of the disclosure. A method 1100 may begin at block 1102 with turning on a driver to begin current ramp through an inductor. Then, at block 1104, it is determined when the current through the inductor exceeds the warning threshold. If the threshold is not exceeded, the method 1100 pauses at block 1104 until the inductor current reaches the warning threshold. After the threshold is exceeded, the method 1100 continues to block 1106 to turn off the driver to stop current through the inductor. Then, at block 1108, it is determined whether the current exceeded the minimum error threshold. If not, the warning threshold level may be increased at block 1110 and the method 1100 is repeated. If so, then the method 1100 may continue to block 1112 to determine whether the current exceeded the maximum error threshold. If so, the warning threshold level is decreased and the method 1100 is repeated. If not, then the method 1100 may continue to block 1116 to terminate the search for the appropriate warning threshold level by holding the threshold level constant for a period of time. The method 1100 may be executed again at a later time when the warning threshold level is determined to need updating or at any other time.

Embodiments of the invention are described in the various apparatuses and methods above. Limiting the current through the inductor may increase safety and decrease hazardous conditions of power converters, such as those in mobile devices, by keeping the inductor current at a level with an error threshold tolerance for the inductor. For example, if an inductor's peak allowable current is 1 Amp, and the allowable error is 5%, then the error threshold tolerance for the inductor may be 0.95 Amps. Embodiments of this disclosure may be used to maintain operation of the inductor at close to 0.95 Amps, whereas prior solutions to limiting current through an inductor would have limited current through the same inductor to 0.70 Amps or less. The use of threshold levels, and in some embodiments variable threshold levels, for the inductor current may allow operation of the inductor at closer to allowable peak current levels than prior operation of power converters. This operation may allow appropriate sizing of the inductor for the circuit and thus cheaper construction of the circuit. For example, with prior solutions, larger inductors may have been included with circuitry than required by the circuitry in order to allow for the possibility of high peak inductor currents.

With embodiments of this disclosure, the inductor sizes may be selected closer to the requirements of the circuitry because the inductor can be operated closer to the safety limits.

A combination of inductor current thresholds and circuitry for controlling the inductor based on the thresholds may be implemented in, for example, a power converter to enhance operation of a circuit, such as for the reasons described above. One or more of the inductor current thresholds may be variable. An inductor current threshold may be varied as part of a search algorithm for identifying a value resulting in full scale operation of the inductor without exceeding a safe limit. After each cycle of the power converter, circuitry may determine which current thresholds have been exceeded and which have not been exceeded and then generate indication signals for each of the thresholds. Control logic may receive the indication signals and adjust one of the inductor current thresholds used to determine timing for disconnecting and reconnecting current through the inductor of the power converter.

The schematic flow chart diagrams of FIG. 3, FIG. 7, and FIG. 11 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although power converters are described throughout the detailed description, aspects of the invention may be applied to the design of other circuitry based on an inductor or that implements current limiting through the inductor. As another example, although limiting current through an inductor is described throughout the detailed description, aspects of the invention may be applied to the design of other circuitry based on other components, such as inductors and/or capacitors, implementing quantities, such as currents and/or voltages, that need to be limited. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
  determining an inductor current through an inductor;
  determining whether the inductor current exceeds a warning threshold;
  determining whether the inductor current exceeds an error threshold;
  adjusting the warning threshold based on the determination of whether the inductor current exceeds the warning threshold and the determination of whether the inductor current exceeds the error threshold, wherein the adjusting of the warning threshold is such that the inductor current is maintained within an error threshold tolerance for the inductor; and
  generating a signal to de-activate a switch to prevent further increase of the inductor current when the determined inductor current exceeds the warning threshold.

2. The method of claim 1, wherein the step of adjusting the warning threshold comprises increasing the warning threshold when the inductor current is determined to not exceed the error threshold.

3. The method of claim 1, wherein the step of adjusting the warning threshold comprises decreasing the warning threshold when the inductor current is determined to exceed the error threshold.

4. The method of claim 1, wherein the step of adjusting the warning threshold comprises executing a search algorithm to determine a warning threshold that triggers the decreasing or increasing of the inductor current at an appropriate time to allow the inductor current to operate within the error threshold tolerance.

5. The method of claim 1, wherein the error threshold comprises an error minimum threshold, and wherein the method further comprises determining whether the inductor current exceeds an error maximum threshold, wherein the step of adjusting the warning threshold comprises adjusting the warning threshold based, at least in part, on the whether the inductor current exceeds the error maximum threshold, and wherein the method further comprises holding the warning threshold when the determined inductor current is between the error minimum threshold and the error maximum threshold.

6. The method of claim 1, wherein the inductor current is current through an inductor of a switch mode converter.

7. The method of claim 1, wherein the inductor is an inductor of a boost converter.

8. The method of claim 1, wherein the inductor is an inductor of an audio amplifier.

9. An apparatus, comprising:
an inductor;
a switch coupled to the inductor;
a current sensor coupled to the inductor through the switch and configured to determine an inductor current through the inductor;
a first comparator coupled to the current sensor and configured to receive an indication of the inductor current, to receive an indication of a warning threshold, and to generate a warning indication signal based on a comparison of the inductor current with the warning threshold;
a second comparator coupled to the current sensor and configured to receive an indication of the inductor current, to receive an indication of an error threshold, and to generate an error indication signal based on a comparison of the inductor current with the error threshold;
a driver coupled to the switch and configured to de-activate the switch based, at least in part, on the generated warning indication signal, wherein de-activating the switch prevents a further increase of the inductor current; and
a controller coupled to the first comparator and the second comparator, wherein the controller is configured to adjust the warning threshold based, at least in part, on the error indication signal and the warning indication signal.

10. The apparatus of claim 9, wherein the driver is configured to de-activate the switch based on the generated warning indication to cause a decrease of the inductor current at an appropriate time to prevent the inductor current from exceeding the error threshold.

11. The apparatus of claim 9, wherein the controller is configured to perform the step of increasing the warning threshold when the inductor current is determined to not exceed the error threshold.

12. The apparatus of claim 9, wherein the controller is configured to perform the step of decreasing the warning threshold when the inductor current is determined to exceed the error threshold.

13. The apparatus of claim 9, further comprising a third comparator coupled to the current sensor and configured to receive an indication of the inductor current, to receive an indication of a second error threshold, and to generate a second error indication signal based on a comparison of the inductor current with the second error threshold, and wherein the controller is further coupled to the third comparator and configured to adjust the warning threshold based, at least in part, on the second error indication signal.

14. The apparatus of claim 9, wherein the apparatus comprises a switch converter.

15. The apparatus of claim 9, wherein the apparatus comprises a boost converter.

16. The apparatus of claim 9, wherein the apparatus comprises an audio amplifier.

17. An apparatus, comprising:
a controller configured to perform the steps of:
receiving an indication of whether an inductor current exceeds a warning threshold;
receiving an indication of whether the inductor current exceeds an error threshold;
adjusting the warning threshold based on the determination of whether the inductor current exceeds the warning threshold and the determination of whether the inductor current exceeds the error threshold, wherein the adjusting of the warning threshold is such that the inductor current is maintained within an error threshold tolerance for the inductor; and
generating a signal to de-activate a switch to prevent further increase of inductor current when the determined inductor current exceeds the warning threshold.

18. The apparatus of claim 17, wherein the step of adjusting the warning threshold comprises increasing the warning threshold when the inductor current is determined to not exceed the error threshold.

19. The apparatus of claim 17, wherein the step of adjusting the warning threshold comprises decreasing the warning threshold when the inductor current is determined to exceed the error threshold.

20. The apparatus of claim 17, wherein the step of adjusting the warning threshold comprises executing a search algorithm to determine a warning threshold that triggers the decrease or increase of the inductor current at an appropriate time to allow inductor current to operate within the error threshold tolerance.

21. The apparatus of claim 17, wherein the error threshold comprises an error minimum threshold, and wherein the controller is further configured to perform the steps of:
receiving an indication of whether the inductor current exceeds an error maximum threshold,
wherein the step of adjusting the warning threshold comprises adjusting the warning threshold based, at least in part, on the indication of whether the inductor current exceeds the error maximum threshold; and
holding the warning threshold when the determined inductor current is between the error minimum threshold and the error maximum threshold.

22. The apparatus of claim 17, wherein the controller is coupled to the switch, and wherein the controller and the switch are part of a boost converter.

23. The apparatus of claim 17, wherein the controller is coupled to the switch, and wherein the controller and the switch are part of an audio amplifier.

* * * * *